No. 868,985. PATENTED OCT. 22, 1907.
G. M. D. HEARD.
RATCHET BRACE.
APPLICATION FILED SEPT. 21, 1906.
2 SHEETS—SHEET 1.
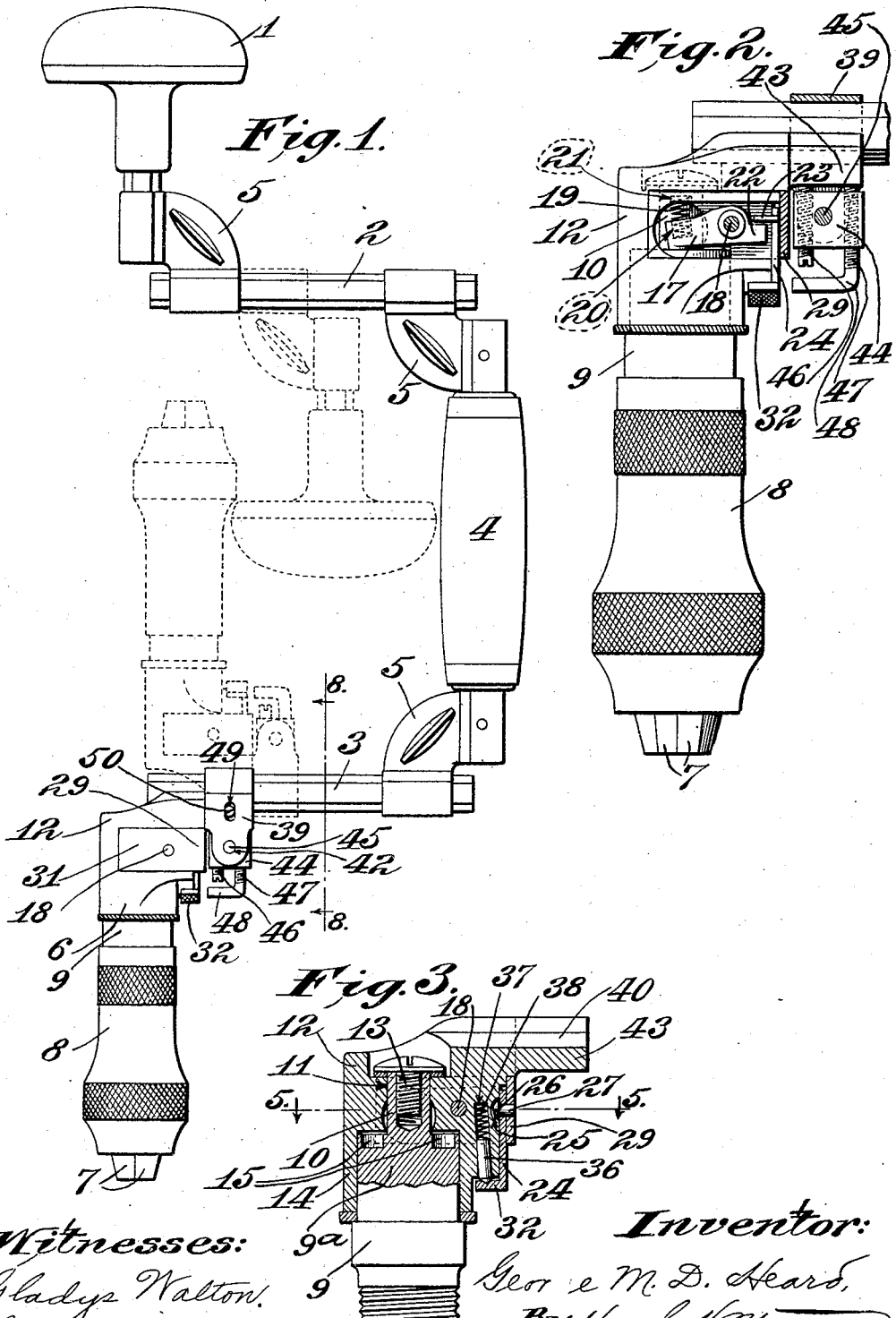
Witnesses:
Gladys Walton.
Elliott R. Goldsmith.
Inventor:
Geor M. D. Heard,
By Hugh K. Wagner
His Atty.

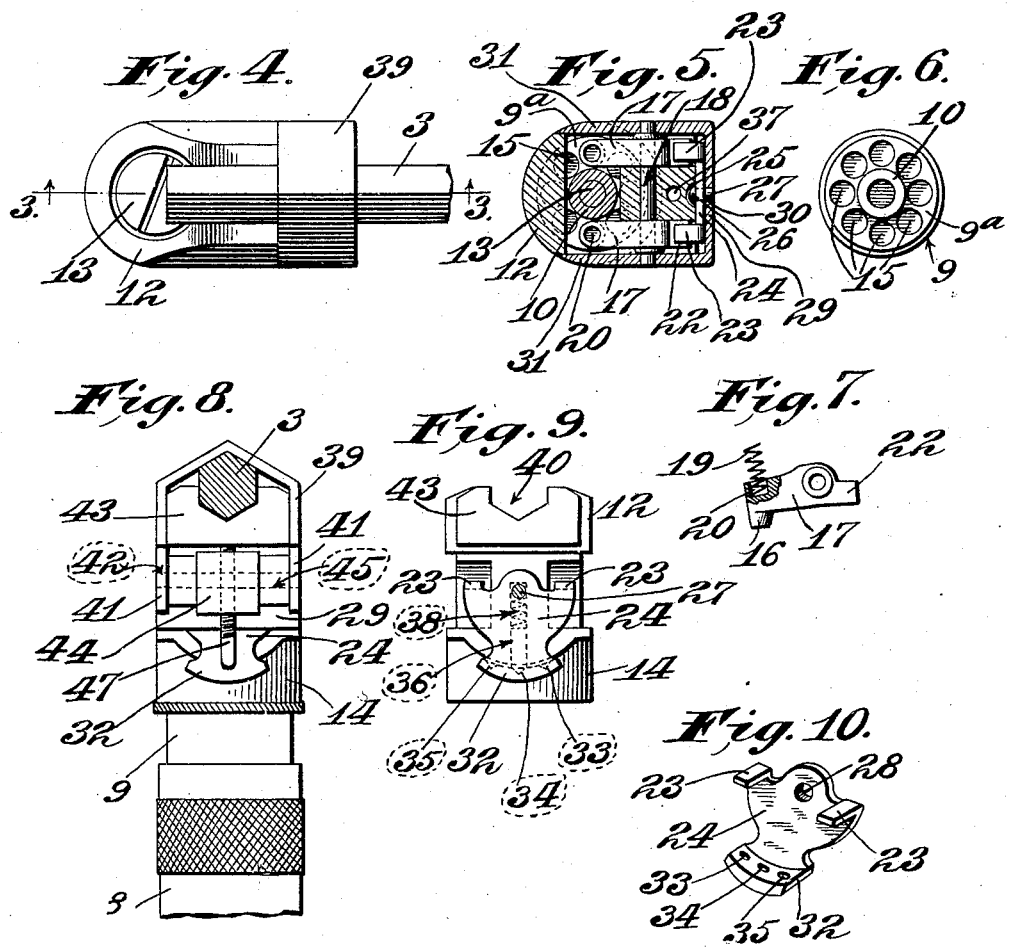

UNITED STATES PATENT OFFICE.

GEORGE M. D. HEARD, OF PAINESVILLE, OHIO.

RATCHET-BRACE.

No. 868,985.     Specification of Letters Patent.     Patented Oct. 22, 1907.

Application filed September 21, 1906. Serial No. 335,561.

*To all whom it may concern:*

Be it known that I, GEORGE M. D. HEARD, a citizen of the United States, residing at the city of Painesville, in the county of Lake and State of Ohio, have invented certain new and useful Improvements in Ratchet-Braces, of which the following is a specification, reference being had therein to the accompanying drawings.

This invention relates to ratchet braces, particularly to an improved form of ratchet means adapted to be used in connection with the brace illustrated in my prior United States Patents Nos. 779,079, issued January 3, 1905, and 810,409, issued January 23, 1906.

In the drawings forming part of this specification, and in which like numbers of reference denote like parts wherever they occur, Figure 1 is a side elevation of a brace embodying my invention; Fig. 2 is an enlarged side elevation of the chuck-holder and connecting parts, part of the outer casing being removed; Fig. 3 is a vertical sectional view on the line 3—3; Fig. 4; Fig. 4 is a top plan view of the chuck-holder secured to the sweep-arm; Fig. 5 is a transverse sectional view on the line 5—5, Fig. 3, omitting the sweep-arm; Fig. 6 is a top plan view of the chuck; Fig. 7 is a detail view of one of the pawls; Fig. 8 is a sectional view on the line 8—8, Fig. 1, the chuck-holder being shown in side elevation; Fig. 9 is a rear view of the cam plate which actuates the pawls, showing same placed in its position in the stock; and Fig. 10 is a front view of the same member detached from its connecting parts.

The top 1, sweep-arms 2 and 3, handle 4, and elbows 5 which connect same together are all constructed and arranged as described in the first of my afore-mentioned Letters-Patent. The parts are depicted in dotted lines in Fig. 1 as being adjusted so that the device is as compact as possible, and in shipping condition.

The chuck-holder 6 comprises the jaws 7, the revolubly-adjusting drum 8, and the externally-threaded chuck 9, upon which the drum 8 is screwed and in the hollowed-out part (not shown) of which the jaws 7 are normally retained. The chuck 9 has a shank 10 which is journaled in a perforation 11 in the stock 12, the top of shank 10 being tapped, so that screw 13 may be driven therein and thus keep the chuck from dropping out of the stock. The usual annular washer is interposed between the screw and the stock. Formed integral with the stock 12 is a collar 14 which encircles the head $9^a$ of chuck 9 below its shank 10, so that the chuck 9 revolves within the stock 12, having its shank journaled in the perforation 11 and its head $9^a$ in the collar 14.

In the head $9^a$ bores or sockets 15 are drilled, same extending downwardly parallel to the axial line of the chuck, and being placed annularly around shank 10, and in these sockets the heads 16 of pawls 17, which are pivotally mounted upon stock 12, are adapted to seat, thus locking the stock and chuck together and causing them to rotate in unison. These pawls are seated in recesses or cut-away parts, one on each side of the stock 12, and are pivoted to said stock by rod 18. A helical spring 19 is provided for each pawl, said springs being seated in sockets 20 and 21 provided therefor, one in the pawl and the other in the upper part of stock 12. These springs tend to keep said pawls normally depressed and the heads 16 thereof projecting into the sockets 15 of chuck 9.

Pawls 17 are provided, at the ends opposite head 16, with extensions 22, which are adapted to be engaged by the fingers 23 of the plate 24, which plate is pivotally mounted in a manner to be hereinafter described, said fingers being adapted, upon rocking of the plate 24, to ride upon and depress the ends 22 of the pawls 17, thereby to lift the heads 16 thereof out of the sockets 15 in which they may have been seated, the pawls moving against the compression of their respective springs 19. The preferred means for mounting plate 23 is to cut a recess 25 in the back of stock 12, and seat the head 26 of a rivet therein, the shank 27 of said rivet projecting outwardly through a perforation 28 in plate 24, which plate thus rocks upon shank 27 as an axis. This shank is preferably placed so that it is approximately on a level with the rod 18 which supports pawls 17. A staple-shaped clamp 29, provided with a recess 30 in which the free end of the shank 27 seats, is then slipped over the plate 24, and the extending arms 31 of this staple-like clamp cover the pawls 17. The ends of these arms are rounded off to correspond with the cylindrical front of the stock 12, thus giving to the device a neat and workmanlike appearance. Clamp 29, accordingly, holds plate 24 in place, as well as keeping the ratchet parts from being unnecessarily exposed, and thereby clogged with dust. This staple-like clamp is secured to the stock or to the tapped ends of rod 18 by screws, and, obviously, by this clamp and the stock 12, the rivet upon which plate 24 rocks is firmly supported.

Secured to, or formed integral with, the lower part of plate 24, is an arcuate flange 32, which projects at right angles to the plane of the plate. Notches 33, 34, and 35 are cut in said flange, and in one of said notches the dog 36 seats. Said dog is mounted in a bore 37 drilled in the stock 12, and a helical spring 38, placed in said bore, forces the dog 36 outwardly to keep its tooth in constant engagement with the flange 32. As plate 24 is rocked upon its axis, dog 36 will seat in one of the notches 33, 34, or 35, and lock said plate against movement, it being understood, of course, that no greater power is necessary for shifting the plate from one position to another than that obtainable from the operator's fingers. The parts are so proportioned that when the plate is set with the dog 36 seated in the middle notch 34, the fingers 23 will not depress the ends 22 of the pawls 17, thus allowing the heads 16 of both of said pawls to seat in sockets 15. When the plate is rocked so that the dog 36 is seated in notch 33, one of the fingers 23 (say, for example, the right-hand one) will ride upon the end 22 of the right-hand pawl 17, and move said pawl against the compression of its spring 19, so that the head 16 thereof is raised out of the socket 15 in which it may have been seated. Simultaneously therewith, the other finger 22 will be carried out of engagement with its pawl (the left-hand one), which, by pressure of its spring 19, has its head 16 kept seated in one of the sockets 15. When the plate 24 is shifted so that dog 36 seats in notch 35, the left-hand pawl which was, in the prior example, described as having its head seated in one of the sockets 15, will be lifted out of engagement therewith, while the position of the other pawl is, likewise, being reversed.

The heads 16 are slightly beveled on one side, so that they will ride out of their sockets and lift the pawls upward against the pressure of springs 19, thus permitting the handle 4 to be turned in one direction without actuating the chuck, but when the handle is moved in the reverse direction, the pawl 17, by seating firmly in a socket 15, will lock the stock and chuck together, so that they rotate in unison. When the plate 24 is so placed that dog 36 seats in notch 35 and the left-hand pawl alone is thus allowed to remain engaging the chuck 9, the chuck 9 will be locked to the stock 12 when the handle 4 is rotated clock-wise, but when the handle is rotated counter-clock-wise the head of said pawl will ride out of the sockets 15 and allow the handle to be rotated in that direction without actuating the chuck. If the dog 36 is seated in notch 33, the handle will actuate the chuck when moved counter-clock-wise, but not when moved clock-wise. If the dog 36 is seated in notch 34, the chuck will be actuated when the handle moves in either direction, as one pawl or the other will be sure to lock stock and chuck together.

In order to hold the stock 12 to the sweep-arm 3, a clamp 39 is provided. The stock is grooved at 40, and the sweep-arm fits in this groove. The clamp 39 loops over the sweep-arm, and the two tongues 41 thereof extend downwardly over the sides of the stock, each of said tongues being perforated at 42. Rearwardly projecting from stock 12 is a shoulder 43. A block 44 bears upon said shoulder, said block having a rod 45 passing therethrough, said rod also passing through the perforations 42 in the clamp 39, thus serving to bind said block and said clamp together. Passing vertically through block 44 are screws 46 and 47, screw 46 being provided with the usual slot into which a screw-driver can be inserted, and screw 47 being bent so that its outer end 48 (which is normally turned inward) is at right angles to the part passing through block 44, thus enabling the operator to turn said screw with his fingers. As either of the screws 46 or 47 is turned, it bears against shoulder 43 and thus pulls clamp 39 downward and binds stock 12 firmly to the sweep-arm 3. The position at which the stock is held upon the arm 3 can thus be quickly adjusted, for, when screws 46 and 47 are loosened, the clamp 39 is no longer held tightly against arm 3, which is then easily slipped back or forth in the opening between clamp 39 and stock 12. In actual practice, screw 47 will be the one more frequently turned to tighten or loosen the clamp when the tool is being used for work in which frequent changes or adjustments are necessary, but in case of longer runs, screw 46 may be used. The tongues 41 are provided with elongated slots 49 through which screws 50 pass into shoulder 43, said screws being adapted to be tightened, when, for any reason, it is desired to secure the clamp 39 more firmly than might be possible by screws 46 or 47 alone.

The operation of the device is largely evident from the foregoing description, but may be summarized as follows: The proper bit having been clamped in the chuck-holder, screws 46 or 47 are tightened to hold the chuck at the proper position upon arm 3. If it is desired to have the bit rotate, no matter in which direction the handle is swung, plate 24 is adjusted so that dog 36 seats in notch 34, thus allowing both pawls to seat in sockets 15 and lock chuck and stock together at all times. When the operator desires to use the device as a ratchet brace, so that the handle can move in one direction in unison with the bit, and in the other direction independently thereof, plate 24 can be adjusted so that dog 36 seats in notch 33 or 35, according to the direction in which movement in unison is desired.

Having thus described my said invention, what I claim and desire to secure by Letters-Patent is:

1. In a ratchet brace, the combination of a chuck, ratchet means in the head thereof, a stock, pawls pivoted upon said stock and engaging said ratchet, a cam-plate for actuating said pawls, a pivot upon which said cam-plate is mounted, and a staple-like bracket, said pivot being supported by said stock and said bracket.

2. In a ratchet brace, the combination of a chuck, ratchet means in the head thereof, a stock, a shaft passing therethrough, pawls pivoted upon said shaft, a cam-plate for actuating said pawls, a pivot upon which said cam-plate is mounted, and a bracket secured by said pawl-bearing shaft, said pivot being supported by said stock and said bracket.

3. In a ratchet brace, the combination of a stock, a pawl-actuating cam-plate, a pivot upon which said plate is mounted, a bracket comprising a pair of arms secured to said stock and a cross-piece, said pivot being supported by said stock and said cross-piece.

4. In a ratchet-brace, the combination of a stock, a pawl-actuating cam-plate, a pivot upon which said plate is mounted, a bracket comprising a cross-piece and a pair of arms secured to said stock, recesses in said stock and in said cross-piece, said pivot being seated in said recesses.

5. In a ratchet brace, the combination of a chuck, sockets in the heads thereof and extending downwardly therein, pawls rocking in a plane parallel to the axial line of the chuck, a member engaging the opposite end of said pawls thereby to actuate said pawls, said member rocking in a plane approximately at right-angles to the plane of movement of said pawls and, likewise, parallel to the axial line of the chuck.

6. In a ratchet brace, the combination of a chuck, sockets in the heads thereof, pawls seating in said sockets, a pawl-actuating member, and means locking said pawl-actuating member in place, said member being locked in three positions, a first position allowing one pawl to seat in said sockets, a second position allowing both pawls to seat in said sockets, and a third position allowing the second pawl to seat in said sockets.

7. In a ratchet brace, the combination of a chuck, sockets in the heads thereof, pivoted pawls rocking in a vertical plane and seating in said sockets, and a pawl-actuating member rocking in a plane intersecting the plane of movement of said pawls, said member being locked in three positions, a first position allowing only one pawl to seat in said sockets, a second position allowing both pawls to seat therein, and a third position allowing the second pawl only to seat in said sockets.

In testimony whereof I have affixed my signature in presence of two witnesses.

GEORGE M. D. HEARD.

Witnesses:
HUGH K. WAGNER,
GLADYS WALTON.